(12) United States Patent
Lawrence et al.

(10) Patent No.: US 7,016,470 B2
(45) Date of Patent: Mar. 21, 2006

(54) SYSTEM AND METHOD FOR X-RAY GENERATION

(75) Inventors: Brian Lee Lawrence, Clifton Park, NY (US); Robert John Filkins, Niskayuna, NY (US); Peter William Lorraine, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/812,339

(22) Filed: Mar. 29, 2004

(65) Prior Publication Data

US 2005/0213708 A1   Sep. 29, 2005

(51) Int. Cl.
  *H01S 4/00*   (2006.01)
  *H01S 3/083*  (2006.01)
  *H01S 3/91*   (2006.01)

(52) U.S. Cl. .................... 378/119; 378/1; 378/122; 372/94; 372/70

(58) Field of Classification Search ............. 378/119, 378/122, 1, 145; 372/92–94, 18
See application file for complete search history.

(56) References Cited

U.S. PATENT DOCUMENTS

| 4,598,415 | A | * | 7/1986 | Luccio et al. ............. 378/119 |
| 5,247,562 | A |   | 9/1993 | Steinbach ................. 378/119 |
| 5,353,291 | A |   | 10/1994 | Sprangle et al. ............ 372/5 |
| 6,035,015 | A |   | 3/2000 | Ruth et al. ............... 378/119 |
| 6,332,017 | B1 |  | 12/2001 | Carroll et al. ............ 378/119 |
| 6,459,766 | B1 | * | 10/2002 | Srinivasan-Rao .......... 378/119 |
| 6,724,782 | B1 | * | 4/2004 | Hartemann et al. .......... 372/5 |
| 2001/0043667 | A1 | * | 11/2001 | Antonell et al. ........... 378/84 |
| 2003/0174741 | A1 | * | 9/2003 | Weingarten et al. ........ 372/18 |
| 2003/0202546 | A1 |  | 10/2003 | Hartemann et al. .......... 372/5 |

FOREIGN PATENT DOCUMENTS

| EP | 0 276 437 | * 12/1987 |
| GB | 2300241 | 10/1996 |

OTHER PUBLICATIONS

Mitsuru Uesaka, Atsushi Fukasawa, Katsuhiro Dobashi, Hokuto Iijima, Junji Urakawa, Toshiyasu Higo, Mitsuo Akemoto, Hitoshi Hayano; Title: "X-Band RF Gun/Linac for Inverse Compton Scattering Hard X-Ray Source"; Proceedings of Linac 2002, Gyeongju, Korea; pp. 628-630.

* cited by examiner

*Primary Examiner*—Craig E. Church
*Assistant Examiner*—Krystyna Suchecki
(74) *Attorney, Agent, or Firm*—Fletcher Yoder

(57) ABSTRACT

The invention provides a system for generating X-rays via the process of inverse Compton scattering. The system includes a high repetition rate laser adapted to direct high-energy optical pulses in a first direction in a laser cavity and a source of pulsed electron beam adapted to direct electron beam in a second direction opposite to the first direction in the laser cavity. The electron beam interacts with photons in the optical pulses in the laser cavity to produce X-rays in the second direction.

51 Claims, 4 Drawing Sheets

US 7,016,470 B2

SYSTEM AND METHOD FOR X-RAY GENERATION

BACKGROUND

The present invention relates generally to X-ray sources, and in particular to a technique for generation of X-rays based on inverse Compton scattering.

For X-ray generation, conventional X-ray sources generally rely on either the Brehmsstrahlung radiation or synchrotron radiation. In the former case, radiation is produced when energetic electrons are decelerated by heavy materials as in common X-ray tubes. Where synchrotron radiation is desired, radiation is produced by ultrahigh energy electron beams passing through magnetic undulators or dipoles in a storage ring synchrotron source. The X-rays produced in common X-ray tubes have drawbacks that pose limitations in their use. For example, Brehmsstrahlung radiations are generally of relatively low power, and comprise long pulses or a continuous wave. Moreover, such radiation typically comprises fixed polarization, incoherent radiation that is not tunable. Synchrotron-generated X-rays also have certain limitations. For example the X-rays generated by the synchrotron source are generally broadband, incoherent, low energy, fixed polarization and untunable. In addition, such sources require high energetic electron beams, which in turn require large and expensive facilities.

Inverse Compton scattering (ICS) is another technique, which has been successfully used to generate X-rays, by using linear accelerators and large, high-powered lasers. In fact, ICS based X-ray sources, due to their coherence and spectral properties offer significant benefits in lower dosage, higher-contrast, and better resolution over conventional X-ray tube technologies. However, current ICS based X-ray sources are typically very large and complex. For example, the lasers typically used in this process are known as $T^3$ (Table-Top Terawatt) lasers and produce short pulses of extremely high energies. These lasers are very complex and require vast numbers of optical elements to operate.

It is therefore desirable to provide a compact and an efficient ICS system that requires lower power lasers and fewer optical elements.

BRIEF DESCRIPTION

Briefly, in accordance with one aspect of the invention, a system is provided for generating X-rays. The system includes a high repetition rate laser to generate high-energy optical pulses in a first direction in a laser cavity and an electron beam source for providing electron beam in a second direction opposite to the first direction in the laser cavity. The electron beam interacts with photons in the optical pulses in the laser cavity to produce X-rays in the second direction.

In accordance with another aspect of the invention, a technique is provided for generating X-rays. The technique includes generating high-energy optical pulses in a laser cavity via a high repetition rate laser, generating electron beam, directing the optical pulses in a first direction, and directing the electron beam into the laser cavity in a second direction opposite to the first direction. The electron beam interacts with photons in the optical pulses in the laser cavity to produce X-rays in the second direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
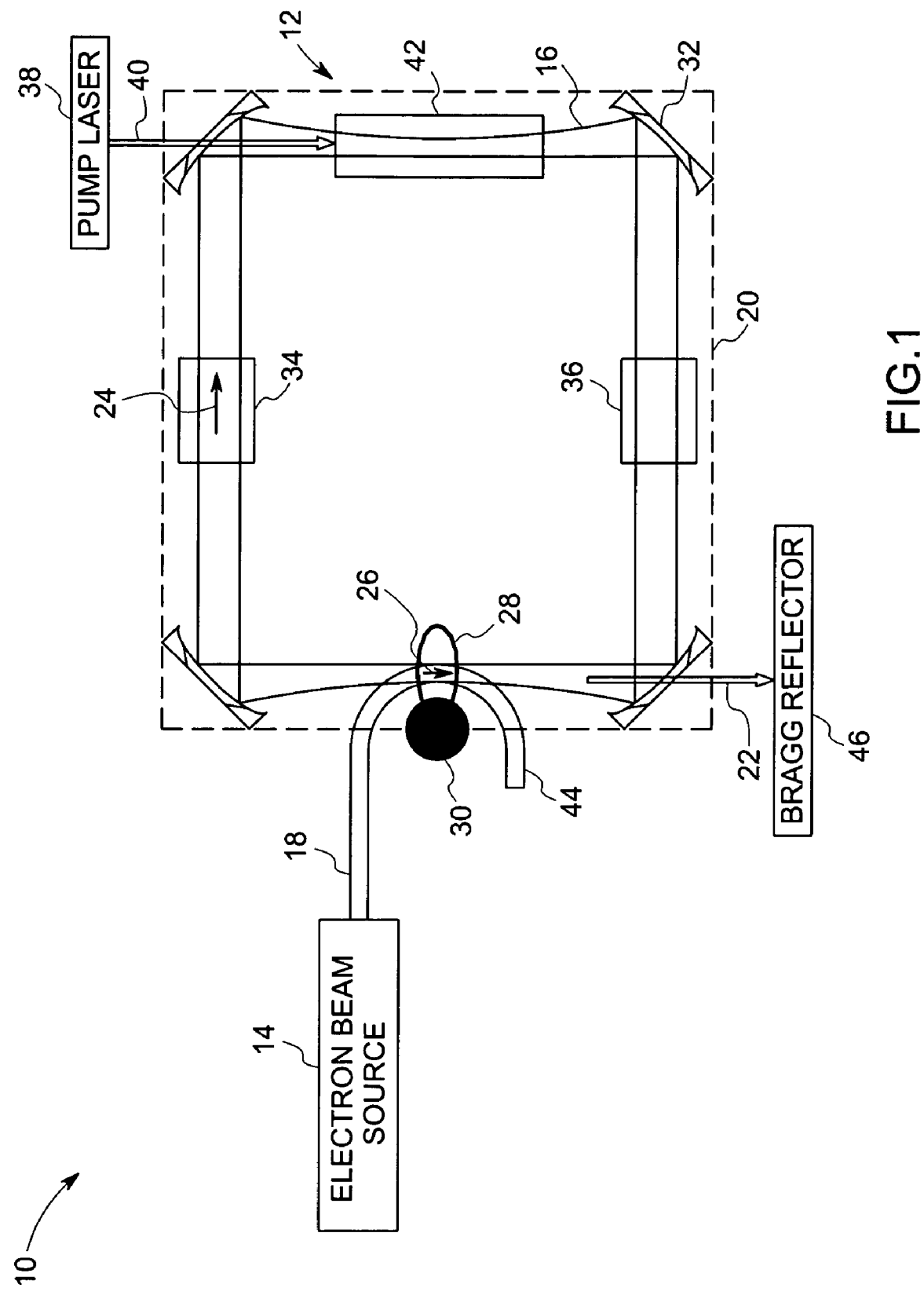
FIG. 1 is a schematic representation of a system for X-ray generation using ICS, according to an exemplary embodiment of the present technique.

Referring now to FIG. 1, an ICS based system 10 includes a laser 12 and an electron beam source 14. The laser 12 generates optical pulses 16, while the electron beam source 14 generates and accelerates a pulsed electron beam 18 to relativistic speeds. As discussed in greater detail below, the optical pulses 16 of the laser 12 are directed in a direction opposite to the direction of the pulsed electron beam 18 such that the two collide within the laser cavity of the laser system 12, generating X-rays by ICS.

In particular, in the illustrated embodiment, the laser 12 includes laser cavity 20 in which the X-ray radiation is generated, as discussed below. Optical pulses 16 are introduced into the cavity 20, and collide with electron beam 18 from the pulsed electron beam source 14. By ICS, then, X-rays, represented generally by reference numeral 22, are generated and directed from the laser cavity 20. Again in the embodiment illustrated in FIG. 1, the optical pulses 16 travel in a first direction, represented by arrow 24 in FIG. 1, within the laser cavity 20, while the electron beam 18 travels in a second direction 26 through a portion of the laser cavity to cross the path of the optical pulses 16 to impact the optical pulses 16 within an interaction zone 28 within the cavity 20. In one embodiment one or more bending magnets 30 may serve to direct the electron beam 18 within the interaction zone 28, as described in greater detail below. As will be appreciated by one skilled in the art, magnets 30 may be eliminated from the system where the electron beam 18 can otherwise be directed into the path of optical pulses 16. The electron beam 18 and the optical pulses 16 impact one another, in a presently contemplated configuration, head-on or nearly head-on (that is, at a very shallow angle).

In the illustrated embodiment, laser 12 includes components contained in a high-finesse optical ring cavity 20 comprising a set of mirrors 32. The laser cavity 20 may be partially or completely evacuated. An isolator 34 serves to force circulation of optical pulses 16 in the desired first direction 24. An active mode-locking device 36 provides a stream of ultra fast mode-locked optical pulses 16. In a presently contemplated embodiment, the mode-locking device 36 may be, for example, an acousto-optic cell or an electro-optic cell and a Brewster plate.

In the illustrated embodiment, the laser system 12 further includes a pump laser 38. The pump laser 38 produces a high-energy pulsed or continuous wave laser beam 40 that is focused on and absorbed by laser rod 42, and which in turn generates the high-energy optical pulses 16. In a presently contemplated embodiment, the laser rod 42 comprises a solid-state gain medium, such as Yb:YAG or Nd:YAG. The high-energy optical pulses 16 travel inside the laser cavity 20 in the pre-determined direction 24. The isolator 34 acts as a gate and allows only those optical pulses 16 which are moving in the pre-determined direction 24 while blocking all others. The pre-determined direction 24 can either be a clockwise direction or an anticlockwise direction.

The mirrors 32 are selected and arranged so as to form a waist in the laser rod 42. The optical pulses 16 are focused and intensified on the waist to achieve a high gain in the gain medium of laser rod 42. Subsequently, a second waist is formed in the interaction zone 28 in the laser cavity 20 where the electron-photon interaction takes place. For example, in one embodiment four curved mirrors 32 in a rectangular configuration may be used to form the laser cavity 20, thereby confining the optical pulses 16 within a closed loop. In an alternative embodiment, the mirrors may be arranged in a triangular, or other configuration to form the laser cavity 20. Mirrors 32 may be off axis paraboloid concave mirrors to focus and intensify the optical pulses 16 at the above-mentioned locations. It should be well appreciated by those skilled in the art that, unlike conventional laser systems in which one of the mirrors is only partially reflective and from which the laser output emanates, all mirrors in the present embodiment are highly reflective so that no output at lasing wavelength is generated.

The active mode-locking device 36, such as an acousto-optic cell or an electro-optic cell and a Brewster plate, as mentioned hereinabove, are used for generating high repetition rate, mode-locked optical pulses 16 of moderately high-energy. The high repetition rate mode-locked laser design is employed to generate sufficient X-ray flux (photons/sec), via multiple, high repetition rate, and lower energy interaction (i.e. lower X-ray photons per pulse but more rapidly interacting pulses) instead of one single large interaction.

As mentioned above, the electron beam source 14 generates an electron beam 18 that is introduced into the laser cavity 20 to interact with the optical pulses 16. In a presently contemplated embodiment, the pulsed electron beam source 14 may be a radio frequency (rf) linear accelerator (LINIAC), an X-band LINIAC or a laser accelerator that accelerates the electron beam to energies of 10 to 250 MeV. The electron beam 18 from the electron beam source 14 is then steered into the laser cavity 20 in a direction 26 opposite to the direction 24 of propagation of the optical pulses 16 such that the electron beam 18 intersect the optical pulses 16 path at a very shallow angle.

The electron beam 18 collides with the optical pulses 16 in the laser cavity 20 to produce X-rays 22 via the process of ICS. The process of ICS is explained in more detail with reference to FIG. 2 herein below. After interacting with the optical pulses 16, the electron beam 18 is then directed out of the laser cavity 20. In one embodiment one or more bending magnets 30 may be used for directing the electron beam 18 into and out of the laser cavity 20. The outgoing electron beam, indicated by reference numeral 44, can either be recycled in the source 14 or disposed of in a graphite block or other dispersion or absorption medium. In a presently contemplated embodiment, the X-rays 22 exit the laser cavity 20 through an X-ray transmitting window which may be made of beryllium or other X-ray transparent materials and are directed in the pre-determined direction via one or more Bragg reflectors 46. The X-rays may be thus directed to locations in which they are employed for various purposes, as described below.

Figure 2:
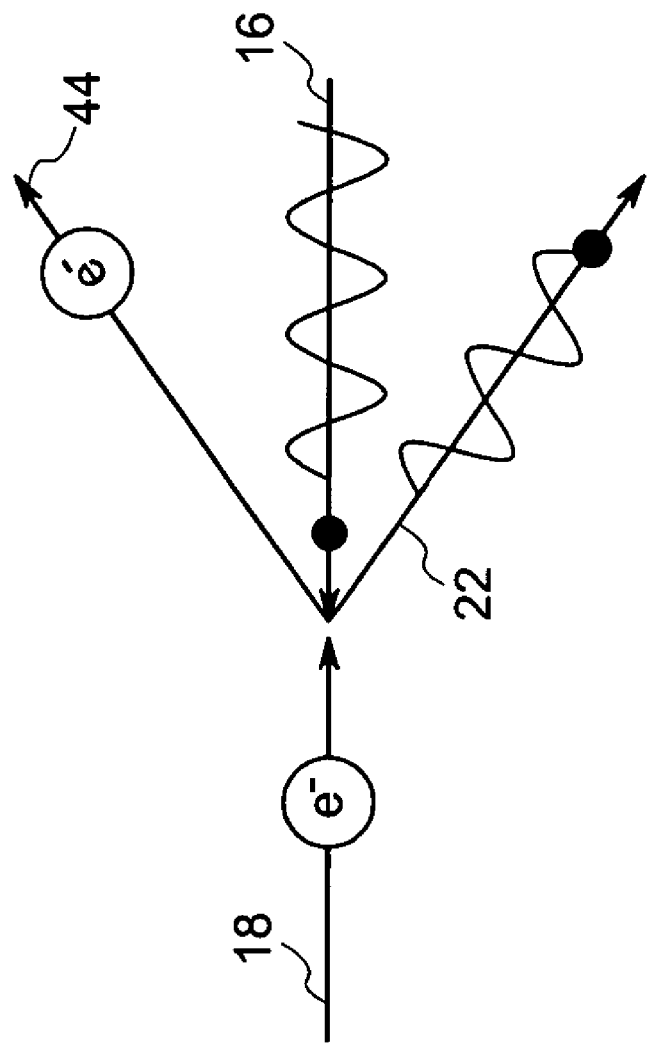
FIG. 2 is a diagrammatical view of the ICS process employed in the technique for generation of X-rays.

FIG. 2 illustrates the generation of X-rays 22 by the ICS process within the laser cavity 20 as described above. The process is indicated generally by the reference numeral 50. The photons in the high-energy optical pulses 16 impact head-on or nearly head-on with incoming relativistic electrons in the electron beam 18, which have more kinetic energy than the photons in the optical pulses 16. The collision results in energy transfer from the electrons to the photons, upconverting the photons to the X-ray region of the spectrum. In particular, the scattered photons gain energy and are shorter in wavelength than the incident photons. The outgoing electron beam 44 has lower kinetic energy than the incident electron beam 18. The X-rays 22 emitted via the process of ICS as described hereinabove, are pulsed, tunable, and nearly monochromatic.

Figure 3:
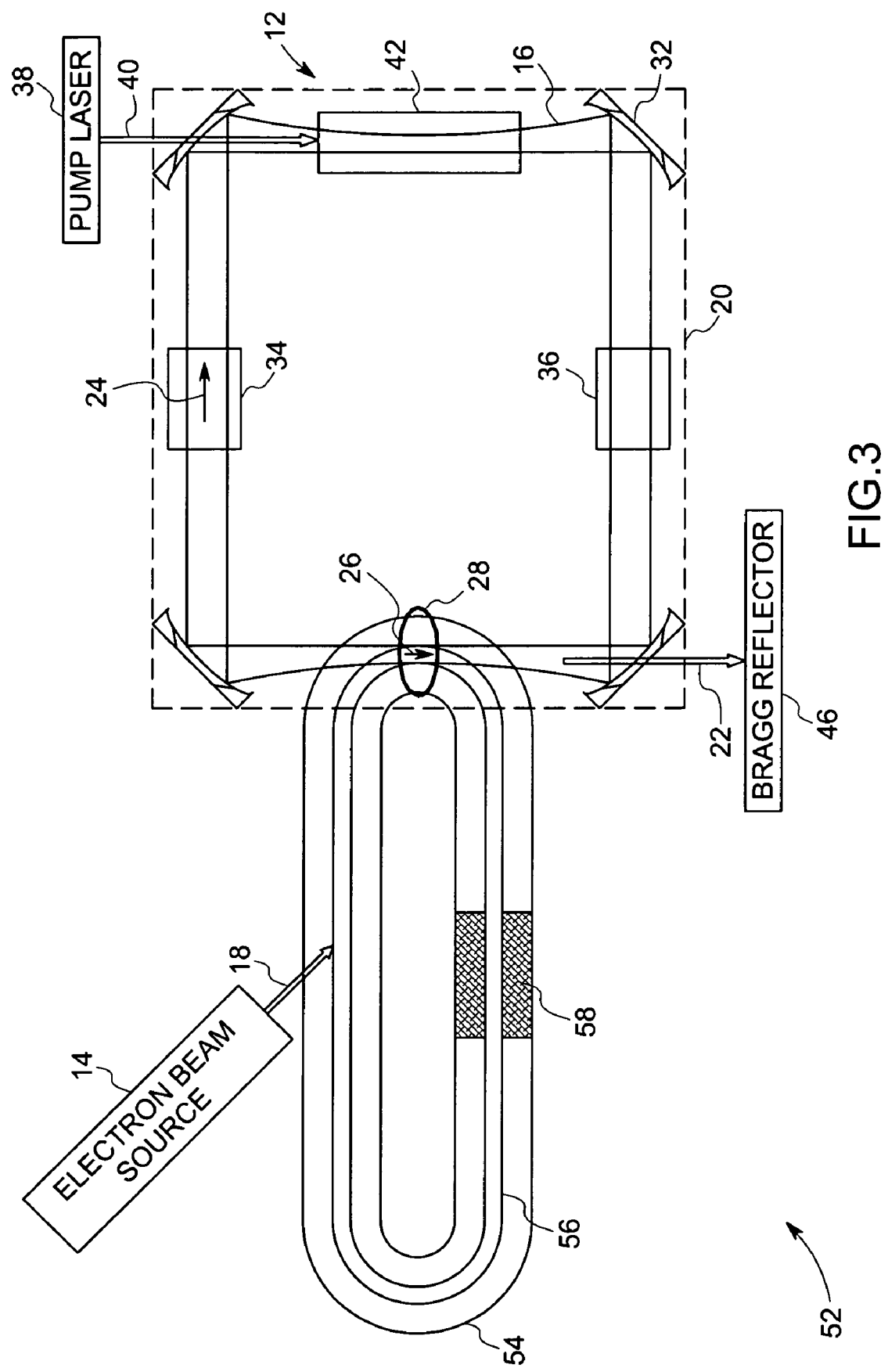
FIG. 3 is a diagrammatical view of an exemplary embodiment of an ICS based X-ray system using an electron storage ring.

In an alternative embodiment, the electron beam source 14, such as an rf LINIAC or a X-band LINIAC, can be replaced by a smaller source which will then drive an electron storage ring 54, as shown in FIG. 3. In this embodiment, the pulsed electron beam 18 from the electron beam source 14 is fed into the electron storage ring 54. A portion of the path defined by the electron storage ring 54 is steered to overlap with the laser cavity 20 in such a way that the pulsed electron beam 56 circulating within the electron storage ring 54 interacts with the optical pulses 16 to produce X-rays 22 via the ICS process described above. In the zone of interaction 28, the pulsed electron beam 56 is nearly collinear, and in opposite direction to the optical pulses 16, as in the previous embodiment described above.

The electron storage ring 54 may include an amplifier 58 to re-energize the circulating electron beam 56. Additionally the round trip circulation time of the electron beam 56 inside the electron storage ring 54 may be synchronized with the round trip time of the optical pulses 16 inside the laser cavity 20 to maximize the interactions between electron beam 56 and the high-energy optical pulses 16. This arrangement may be more energy efficient than introducing new pulses of electrons, and reduces reliance on a large electron beam source. Synchronization between the optical pulses 16 and the electron beam 56 may be achieved, for example, by driving the mode-locked oscillator 36 at subharmonics of the master oscillator signal of the electron beam source 14.

Figure 4:
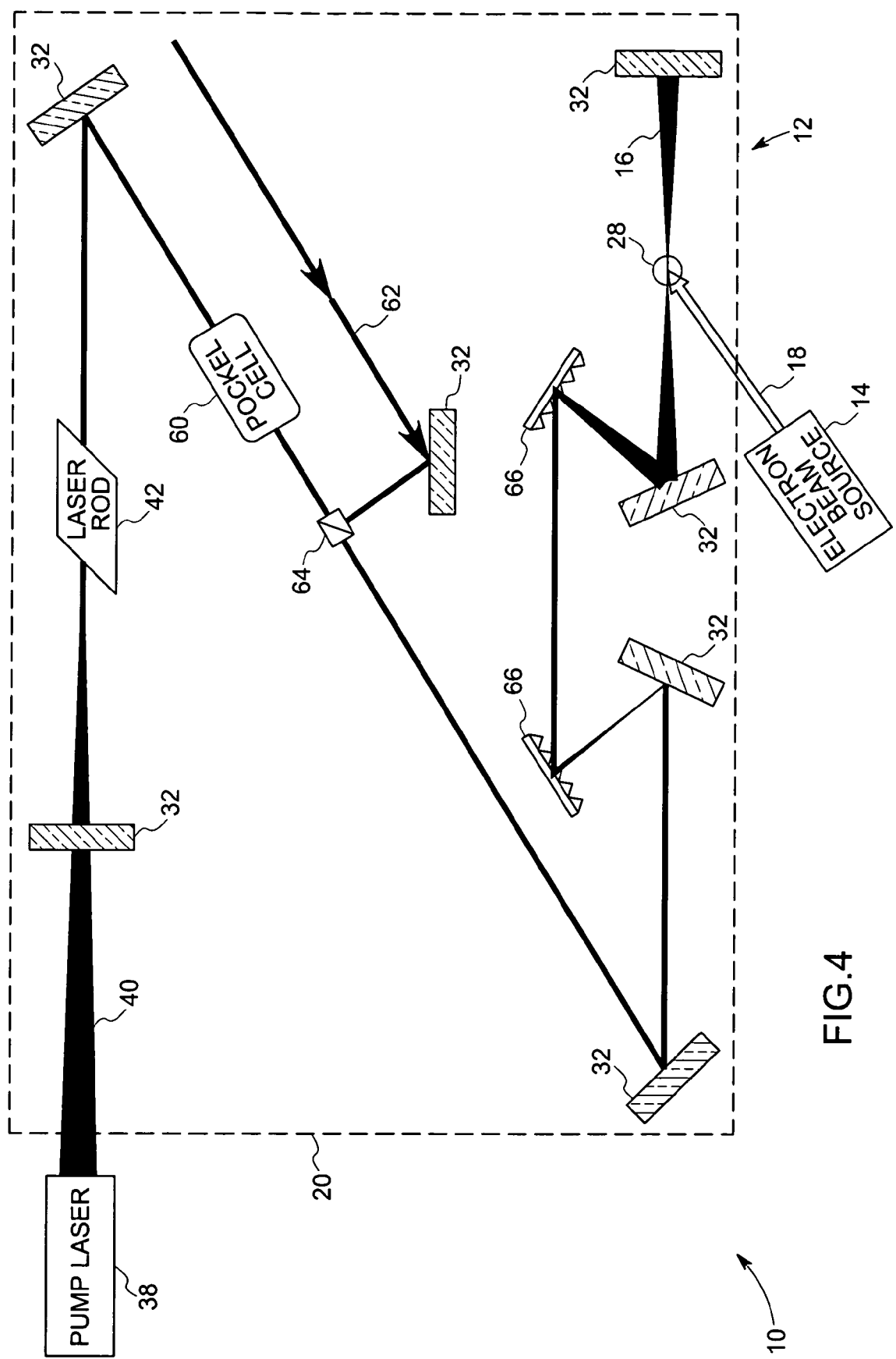
FIG. 4 is a diagrammatical view of another exemplary embodiment of an ICS based X-ray system using a regenerative amplifier as a laser.

In another alternative embodiment, a regenerative amplifier may be used as a laser 12 as shown in FIG. 4. In this embodiment, the optical pulses are stretched, amplified and recompressed to generate high-energy optical pulses 16. The pump laser 38 feeds the laser rod 42 with the high-energy pulsed or continuous wave laser beam 40 that in turn generates the high-energy optical pulses 16, in a manner similar to that described above. The laser rod 42 is cut at the Brewster angle so as to minimize losses and to maximize the gain inside the laser rod 42. At the Brewster angle, the optical pulses 16, polarized parallel to the angle of incidence, are transmitted completely with no reflective losses. This technique also prevents the peak power generated from damaging the laser rod 42.

The mirrors 32 are used to confine these high-energy optical pulses 16 within the laser cavity 20. The optical pulses 16 are gated by using optical devices 60, such as Pockel cells that allow the optical pulses 16 in a first polarized state to pass through. An incoming seed optical pulse 62 is used to initiate the build-up of the high-energy optical pulses 16 inside the laser cavity 20. A polarizing beam splitter 64 sends the incoming seed optical pulse 62 into the laser cavity 20. The polarization of seed optical pulse 62 is then altered by optical device 60 to match that of the optical pulses 16 in the cavity so that the seed optical pulse 62 is confined within the laser cavity 20. The optical pulses 16 are further stretched, amplified and then recompressed using gratings 66 such as diffraction grating, and the energy of the optical pulses 16 thereby increases manifold. A diffraction grating consists of a plate or film with a series of closely spaced lines or grooves (typically many thousands per inch/hundreds per mm) and may be of the transmission or reflection type. The latter type will be coated with a thin film of reflective material like aluminum or gold. In one specific embodiment the optical pulses 16 are stretched in an all-reflective two-grating pulse stretcher before amplification and then recompressed in a two-grating compressor. The stretcher and compressor consist entirely of reflective optics to minimize the contribution of higher order phase terms, thereby maintaining the fidelity of the optical pulses 16. These high-energy optical pulses 16 are then directed to the interaction zone 28 where they interact with the electron beam 18 to produce the X-rays 22 via the ICS process 50. The incoming electron beam 18 from the electron source 14 is steered into the laser cavity 20 and is nearly collinear, and in opposite direction to the high-energy optical pulses 16. The optical pulses 16 circulate within the laser cavity 20 and on each round trip release a fraction of their energy to generate X-rays 22. The energy released by the optical pulses is regenerated upon a pass through the laser rod 42. In short, once the system 10 is seeded with the incoming seed optical pulse 62, it is operational as long as the ICS process is not extracting more energy than the laser rod 42 can replenish.

In the embodiments described hereinabove, the laser 12 has an output at a wavelength, different from the lasing wavelength. This is analogous to the incorporation of intracavity doublers in the laser, where laser has no output at the lasing wavelength, but instead has an output at a different wavelength generated by a nonlinear frequency conversion process in a nonlinear optical element inside the cavity. Moreover, in the embodiments illustrated hereinabove, the electron beam 18 acts as the nonlinear optical element and the output of the laser 12 lies in the X-ray spectrum.

System 10 and its function in generating X-rays reduce the complexity of traditional systems by folding the resonant cavity and the laser source into a single laser system 12 and using the X-ray 22 emission as the output coupling of the laser system 12. In addition the optical pulses 16 inside the laser cavity 20 are orders of magnitude higher than those produced at the output of the laser source.

The X-rays generated via the process of ICS as described in the various embodiments discussed above have a nearly monochromatic spectral nature as opposed to the broad energy distribution of traditional Brehmsstrahlung processes and have quasi-coherent characteristics. These features offer significant benefits in a number of applications, such as to the medical imaging community including, lower dosage, improved contrast, improved resolution, and new types of diagnostic imaging. For example, these X-rays may be applied for the diagnosis of breast diseases including cancer. Cancerous breast tissues exhibit higher linear attenuation characteristics than do normal tissues, when studied with monochromatic X-rays. This property can be used to provide better contrast images. These improvements in imaging are not restricted to the breast, but can be applied to any anatomy, and various examination procedures, such as coronary arteriography.

Other areas of potential uses are cell biology and material sciences such as crystallography and X-ray lithography. The monochromaticity and narrow divergence angle of these X-rays not only allow the Bragg reflectors to divert the beam from a vault to an imaging laboratory above the vault, but also allow the redirection of the beam in a circular fashion, such as for creating CT images using conebeam backprojection algorithms. The fact that the X-rays are pulsed in picoseconds (ps) bursts, permits them to be used for time-of-flight imaging, where data is collected by imaging only ballistic photons up to 180 ps from the initiation of the exposure and ignoring scatter exiting over many nanoseconds. It is believed that the present technique can thus result in significant improvements in conspicuity. Moreover, the small effective spot size of X-ray beam enables the performance of phase contrast imaging using information traditionally discarded in conventional imaging. In addition, there is decreased scatter due to the tunability of the beam and the limited bandwidth/narrow energy range delivered to the imaged part.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for generating X-rays, the system comprising:
   a high repetition rate laser source disposed in a ring-shaped cavity and adapted to generate and direct high-energy optical pulses in a first direction in the ring-shaped cavity; and
   a source of a pulsed electron beam adapted to generate and direct the pulsed electron beam in a second direction opposite to the first direction in the ring-shaped cavity, the pulsed electron beam impacting photons in the optical pulses in the ring-shaped cavity to produce X-rays in the second direction.

2. The system of claim 1, further comprising a plurality of mirrors located in the ring-shaped cavity for confining the optical pulses within the ring-shaped cavity.

3. The system of claim 2, wherein the plurality of mirrors are arranged in a ring configuration.

4. The system of claim 1, further comprising an isolator located in the ring-shaped cavity for directing the optical pulses in the first direction.

5. The system of claim 1, wherein the high energy optical pulses comprise high repetition rate, mode-locked optical pulses.

6. The system of claim 5, further comprising an acousto-optic cell located in the ring-shaped cavity for generating the high repetition rate, mode-locked optical pulses.

7. The system of claim 5, further comprising an electro-optic cell and a Brewster plate located in the ring-shaped cavity for generating the high repetition rate, mode-locked optical pulses.

8. The system of claim 1, wherein the high repetition rate laser source comprises a solid state laser rod for generating the optical pulses.

9. The system of claim 8, wherein the solid state laser rod is a Yb:YAG laser rod.

10. The system of claim 1, further comprising a grating located in the ring-shaped cavity for temporally stretching the optical pulses.

11. The system of claim 1, further comprising a grating located in the ring-shaped cavity for temporally compressing the optical pulses.

12. The system of claim 1, wherein the source of the pulsed electron beam is a radio frequency linear accelerator.

13. The system of claim 1, further comprising one or more magnets to direct the pulsed electron beam in the second direction in the ring-shaped cavity.

14. The system of claim 1, further comprising one or more Bragg reflectors to direct the X-rays in a pre-determined direction from the ring-shaped cavity.

15. A system for generating X-rays, the system comprising:
- a mode-locked laser source disposed in a ring-shaped cavity and adapted to generate and direct high-energy optical pulses in a first direction in the ring-shaped cavity; and
- a source of a pulsed electron beam adapted to generate and direct the pulsed electron beam in a second direction opposite to the first direction in the ring-shaped cavity, the pulsed electron beam impacting photons in the optical pulses in the ring-shaped cavity to produce X-rays in the second direction.

16. The system of claim 15, further comprising an isolator located in the ring-shaped cavity for directing the optical pulses in the first direction.

17. The system of claim 15, wherein the high energy optical pulses comprise high repetition rate, mode-locked optical pulses.

18. The system of claim 17, further comprising an acousto-optic cell located in the ring-shaped cavity for generating the high repetition rate, mode-locked optical pulses.

19. The system of claim 17, further comprising an electro-optic cell and a Brewster plate located in the ring-shaped cavity for generating the high repetition rate, mode-locked optical pulses.

20. The system of claim 15, wherein the source of the pulsed electron beam is a radio frequency linear accelerator.

21. The system of claim 15, further comprising one or more magnets to direct the pulsed electron beam in the second direction opposite to the first direction in the ring-shaped cavity.

22. A system for generating X-rays, the system comprising:
- a mode-locked laser source disposed in a ring-shaped cavity and adapted to generate high-energy optical pulses in the ring-shaped cavity;
- an isolator located in the ring-shaped cavity for directing the optical pulses in a first direction; and
- a source of a pulsed electron beam adapted to generate and direct the pulsed electron beam in a second direction opposite to the first direction in the ring-shaped cavity, the pulsed electron beam impacting photons in the optical pulses in the ring-shaped cavity to produce X-rays in the second direction.

23. The system of claim 22, wherein the high energy optical pulses comprise high repetition rate, mode-locked optical pulses.

24. The system of claim 23, further comprising an acousto-optic cell located in the ring-shaped cavity for generating the high repetition rate, mode-locked optical pulses.

25. The system of claim 23, further comprising an electro-optic cell and a Brewster plate located in the ring-shaped cavity for the generating high repetition rate, mode-locked optical pulses.

26. The system of claim 22, wherein the source of the pulsed electron beam is a radio frequency linear accelerator.

27. The system of claim 22, further comprising one or more magnets to direct the pulsed electron beam in the second direction opposite to the first direction in the ring-shaped cavity.

28. A system for generating X-rays, the system comprising:
- a mode-locked laser source disposed in a ring-shaped cavity and adapted to generate and direct high-energy optical pulses in a first direction in the ring-shaped cavity; and
- a source of a pulsed electron beam adapted to feed the pulsed electron beam in an electron storage ring overlapping the ring-shaped cavity, the electron storage ring adapted to circulate the pulsed electron beam in a second direction opposite to the first direction in the ring-shaped cavity, the pulsed electron beam impacting photons in the optical pulses in the ring-shaped cavity to produce X-rays in the second direction.

29. The system of claim 28, further comprising an isolator located in the ring-shaped cavity for directing the optical pulses in the first direction.

30. The system of claim 28, wherein the high energy optical pulses comprise high repetition rate, mode-locked optical pulses.

31. The system of claim 30, further comprising an acousto-optic cell located in the ring-shaped cavity for generating the high repetition rate, mode-locked optical pulses.

32. The system of claim 30, further comprising an electro-optic cell and a Brewster plate located in the ring-shaped cavity for generating the high repetition rate, mode-locked optical pulses.

33. The system of claim 28, wherein the source of the pulsed electron beam is a radio frequency linear accelerator.

34. The system of claim 28, wherein the electron storage ring is adapted to store and circulate the pulsed electron beam.

35. The system of claim 28, wherein a round trip circulation time of the pulsed electron beam in the electron storage ring is substantially equivalent to a round trip time of the optical pulses in the ring-shaped cavity.

36. The system of claim 28, wherein the electron storage ring further includes an amplifier to accelerate the pulsed electron beam circulating in the electron storage ring.

37. A system for generating X-rays, the system comprising:
- a mode-locked laser source disposed in a ring-shaped cavity and adapted to generate high-energy optical pulses in the ring-shaped cavity;
- an isolator located in the ring-shaped cavity for directing the optical pulses in a first direction; and
- a source of a pulsed electron beam adapted to feed the pulsed electron beam in an electron storage ring overlapping the ring-shaped cavity, the electron storage ring adapted to circulate the pulsed electron beam in a second direction opposite to the first direction in the ring-shaped cavity, the pulsed electron beam impacting photons in the optical pulses in the ring-shaped cavity to produce X-rays in the second direction.

38. The system of claim 37, wherein the high energy optical pulses comprise high repetition rate, mode-locked optical pulses.

39. The system of claim 38, further comprising an acousto-optic cell located in the ring-shaped cavity for generating the high repetition rate, mode-locked optical pulses.

40. The system of claim 38, further comprising an electro-optic cell and a Brewster plate located in the ring-shaped cavity for generating the high repetition rate, mode-locked optical pulses.

41. The system of claim 37, wherein the source of the pulsed electron beam is a radio frequency linear accelerator.

42. The system of claim 37, wherein the electron storage ring is adapted to store and circulate the pulsed electron beam.

43. The system of claim 37, wherein a round trip circulation time of the pulsed electron beam in the electron storage ring is substantially equivalent to a round trip time of the optical pulses in the ring-shaped cavity.

44. The system of claim 37, wherein the electron storage ring further includes an amplifier to accelerate the pulsed electron beam circulating in the electron storage ring.

45. A method for generating X-rays, the method comprising:
generating high-energy optical pulses in a ring-shaped cavity via a high repetition rate laser source disposed in the ring-shaped cavity, the optical pulses being directed in a first direction;
generating a pulsed electron beam; and
directing the pulsed electron beam into the ring-shaped cavity in a second direction opposite to the first direction, photons in the optical pulses impacting the pulsed electron beam to generate X-rays in the second direction.

46. The method of claim 45, further comprising confining the optical pulses within the vacumm cavity via a plurality of mirrors located in the ring-shaped cavity.

47. The system of claim 45, wherein the high energy optical pulses comprise high repetition rate, mode-locked optical pulses.

48. The method of claim 47, further comprising generating the high repetition rate, mode-locked optical pulses via an acousto-optic cell located in the ring-shaped cavity.

49. The method of claim 47, further comprising generating the high repetition rate, mode-locked optical pulses via an electro-optic cell and a Brewster plate located in the ring-shaped cavity.

50. The method of claim 45, further comprising temporally stretching the optical pulses via a grating located in the ring-shaped cavity.

51. The method of claim 45, further comprising temporally compressing the optical pulses via a grating located in the ring-shaped cavity.

* * * * *